United States Patent Office 3,429,916
Patented Feb. 25, 1969

3,429,916
PREPARATION OF PHOSPHORUS HALIDES
Joseph W. Baker, Kirkwood, and Raymond E. Stenseth,
St. Louis, Mo., assignors to Monsanto Company, St.
Louis, Mo., a corporation of Delaware
No Drawing. Filed Dec. 22, 1965, Ser. No. 515,754
U.S. Cl. 260—543      15 Claims
Int. Cl. C07f 9/52; C09k 3/28; C10m 1/48

This invention relates to processes for the preparation of compounds of phosphorus and more particularly to processes for the preparation of organophosphonothioic dihalides and diorganophosphinothioic halides.

In accordance with this invention phosphorus compounds selected from the group consisting of compounds represented by the formula

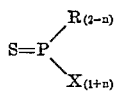

wherein R, which can be the same or different, is hydrocarbyl of not more than 18 carbon atoms bonded to the phosphorus atom through a carbon phosphorus bond, X is halogen (Cl, Br, F and I) and $n$ is an integer from 0 to 1, and mixtures thereof are prepared by the process which comprises reacting an organic disulfide of the formula RSSR with a phosphorus trihalide of the formula $PX_3$ wherein each R is hydrocarbyl of not more than 18 carbon atoms and X is as defined above. The reaction of this invention can be represented by the following non-stoichiometric expression

In accordance with the above represented reaction, the process of this invention results in the concomitant production of organophosphonothioic dihalides [RP(S)X$_2$] and diorganophosphinothioic halides [R$_2$P(S)X]. When substantially equimolar amounts of reactants are employed, the organophosphonothioic dihalides generally comprise a major amount of the product phosphorus compounds and the diorganophosphinothioic halides a minor amount of the product phosphorus compounds. However, the ratio of diorganophosphinothioic halide to organophosphonothioic dihalide in the product phosphorus compounds can be increased by using an excess of organic sulfide reactant.

Representative R hydrocarbon radicals for the compounds of the above formulae prepared by the process of this invention include by way of example alkyl (1 to 18 carbon atoms) such as methyl, ethyl, n-propyl, isopropyl, n-butyl, sec-butyl, isobutyl, tert-butyl, amyl, hexyl, heptyl, octyl, nonyl, decyl, dodecyl, tetradecyl, hexadecyl, octadecyl and the various homologues and isomers of alkyl having from 1 to 18 carbon atoms; alkenyl (2 to 18 carbon atoms) such as vinyl, allyl, n-butenyl-1, n-butenyl-2, n-pentenyl-2, n-hexenyl-2, 2,3-dimethylbutenyl-2, n-heptenyl, n-decenyl, n-dodecenyl and the various homologues and isomers of alkenyl having 2 to 18 carbon atoms; alkynyl (3 to 18 carbon atoms) such as propargyl and the various homologues and isomers of alkynyl having from 3 to 18 carbon atoms; cycloalkyl and alkyl substituted cycloalkyl (3 to 18 carbon atoms) such as cyclopentyl, cyclohexyl, mono- and polymethylcyclohexyl, mono- and polyethylcyclohexyl, cycloheptyl and the like; cycloalkenyl and alkyl substituted cycloalkenyl (3 to 18 carbon atoms) such as cyclopentenyl, cyclohexenyl, cycloheptenyl, mono- and polyethylcyclohexenyl and the like; aryl (6 to 18 carbon atoms) such as phenyl, biphenyl, naphthyl and the like; aralkyl (7 to 18 carbon atoms) such as benzyl, phenylethyl, diphenylmethyl and the like and alkaryl (7 to 18 carbon atoms) such as tolyl, ethylphenyl, xylyl, butylphenyl, tert-butylphenyl, trimethylphenyl, diethylphenyl, methylpropylethylphenyl and the like.

The process of this invention is usually carried out with substantially equimolar amounts of organic disulfide and phosphorus trihalide, but an excess of either can be used. The reaction can be carried out in the liquid or vapor phase at temperatures from about 100° C. to about 600° C. Preferably the liquid phase reaction is carried out at temperatures from about 150° C. to about 350° C. from the standpoint of optimum conversion in reasonable reaction periods. Reaction temperatures below about 100° C. can be used, but the reaction time is increased substantially at such lower temperatures. At temperatures above about 350° C. in the liquid phase decomposition occurs and the yield of phosphonothioic and phosphinothioic compounds is substantially reduced. The vapor phase reaction is preferably carried out at temperatures from about 300° C. to 600° C. The reaction can be carried out at subatmospheric, atmospheric or superatmospheric pressure, the pressure not being critical. The exact reaction conditions, i.e., time, temperature and pressure will depend upon the specific organic sulfide employed. The reaction can be carried out in the presence of an inert organic medium or inert carrier gas. Suitable organic media include for example, xylene, mesitylene, decahydronaphthalene, dichlorobenzene, benzene, toluene, tetrahydronaphthalene and chlorinated biphenyls. Suitable vapor phase inert carriers include for example nitrogen, helium, argon and methane.

Various halide catalysts can be employed in the process of this invention. It is particularly advantageous from the standpoint of increased yield and less severe reaction conditions to carry out the reaction in the presence of a halide catalyst selected from the group consisting of (a) organic halides of the formula $(R')X_m$ wherein R' is hydrocarbyl of not more than 18 carbon atoms selected from the group consisting of alkyl, alkenyl, alkynyl, cycloalkyl and aralkyl, X is halogen (Cl, Br, I and F) and $m$ is an integer from 1 to 3, (b) inorganic halides of the formula $MeX_v$ wherein Me is selected from the group consisting of metal and $NH_4$, X is halogen (Cl, Br, I and F) and $v$ is the actual valence of Me and is an integer from 1 to 6 and (c) halogens selected from the group consisting of $Cl_2$, $Br_2$ and $I_2$. Mixtures of the above halide catalysts also can be employed in the process of this invention.

Representative organic halide catalysts of the formula $(R')X_m$ which can be used in this invention include by way of example alkyl halides such as

| | |
|---|---|
| methyl chloride, | 2,3-dichloropentane, |
| methyl iodide, | 3,3-dibromopentane, |
| methyl bromide, | hexyl chloride, |
| methyl fluoride, | hexyl bromide, |
| ethyl chloride, | 2,4-dichlorohexane, |
| ethyl iodide, | 1,3-dibromohexane, |
| ethyl bromide, | 1,3,4-trichlorohexane, |
| ethyl fluoride, | heptyl chloride, |
| dichloroethane, | heptyl bromide, |
| n-propyl chloride, | heptyl fluoride, |
| n-propyl bromide, | 1,3-dichloroheptane, |
| isopropyl iodide, | 1,4,4-trichloroheptane, |
| n-butyl bromide, | 2,4-dichloromethylheptane, |
| sec-butyl iodide, | octyl chloride, octyl bromide, |
| tert-butyl bromide, | octyl iodide, |
| 1,3,3-trichlorobutane, | 2,4-dichloromethylhexane, |
| 1,3,3-tribromobutane, | 2,4-dichlorooctane, |
| pentyl chloride, | 2,4,4-trichloromethylpentane, |
| pentyl bromide, | 1,3,5-tribromooctane | and the straight and branched chain nonyl, decyl, undecyl, dodecyl, tridecyl, tetradecyl, pentadecyl, hexadecyl, heptadecyl and octadecyl chlorides, bromides, fluorides and iodides; alkenyl halides such as vinyl chloride,
vinyl bromide,
allyl chloride,
allyl bromide,
3-chloro-n-butylene-1,
3-chloro-n-pentylene-1,
4-chloro-n-hexylene-2,
3,4-dichloromethyl-n-pentylene-1,
3-chloro-n-heptylene-1,
1,3,3-trdichloro-n-heptylene-5,
1,3,5-trichloro-n-octylene-6,
2,3,3-trichloromethylpentylene-4 and the various homologues and isomers of alkenyl halides having 2 to 18 carbon atoms; alkynyl halides such as propargyl chloride, propargyl bromide, propargyl iodide and the various homologues and isomers of alkynyl halides having 3 to 18 carbon atoms; cycloalkyl halides such as chlorocyclopentane, bromocyclopentane, 2,4 - dichlorocyclopentane, chlorocyclohexane, bromocyclohexane, 2,4 - dichlorocyclohexane, 2,4,5 - trichlorocyclohexane, chlorocycloheptane, 2,5-dichlorocycloheptane, 2,4,5-tribromocycloheptane and the like, and aralkyl halides such as benzyl chloride, benzyl bromide, chlorophenylethane, bromophenylethane, 2,4-dichlorophenylethane, 2,4,5-trichlorophenylethane, 2,4,6 - tribromophenylethane, di(2,4-dichlorophenyl)methane and the like. The preferred organic halide catalysts of the formula $(R')X_m$ are those wherein $R'$ is alkyl, alkenyl, alkynyl, cycloalkyl or aralkyl having not more than 8 carbon atoms, X is chloride and $m$ is an integer from 1 to 3.

Representative metallic halide catalysts of the formula $MeX_y$ which can be used in this invention include by way of example the halides of Na, K, Ti, Ba, Al, Sb, As, Be, Bi, Cd, Ce, Co, Cu, Ga, Au, In, Fe, La, Pb, Mn, Hg, Nb, Ni, Os, Re, Se, Ag, Ta, Tl, Sn, Zn, and the like.

Specific examples of suitable inorganic halide catalysts of the formula $MeX_y$ include by way of example:

| | | | |
|---|---|---|---|
| $AlBr_3$ | $BiI_3$ | $GaBr_3$ | $PbBr_2$ |
| $AlCl_3$ | $CdBr_2$ | $GaCl_3$ | $KBr$ |
| $AlF_3$ | $ReCl_6$ | $GaI_3$ | $SnCl_4$ |
| $SbBr_3$ | $SeF_4$ | $AuBr$ | $TiCl_4$ |
| $SbCl_3$ | $AgBr$ | $AuBr_3$ | $TiBr_4$ |
| $SbI_3$ | $AgF$ | $AuCl$ | $TiI_4$ |
| $SbCl_5$ | $AgI$ | $AuCl_3$ | $NH_4I$ |
| $SbI_3$ | $TaCl_5$ | $AuI_3$ | $PbCl_2$ |
| $SbI_5$ | $CdCl_2$ | $InBr_3$ | $PbI_2$ |
| $AsBr_3$ | $CdF_2$ | $InCl_3$ | $MnBr_3$ |
| $AsCl_3$ | $CdI_2$ | $ZnI_2$ | $MnCl_2$ |
| $NbCl_5$ | $CeCl_3$ | $NaCl$ | $MnI_2$ |
| $NiBr_2$ | $CoBr_2$ | $NaI$ | $HgBr_2$ |
| $NiCl_2$ | $CoCl_2$ | $NaBr$ | $HgBrI$ |
| $NiI_2$ | $CoI_2$ | $KCl$ | $HgCl_2$ |
| $OsF_6$ | $CuBr$ | $NH_4Cl$ | $HgF_2$ |
| $ReCl_3$ | $CuBr_2$ | $InI_3$ | $HgI_2$ |
| $AsF_3$ | $CuCl$ | $FeBr_2$ | $NbBr_5$ |
| $AsI_3$ | $CuCl_2$ | $FeBr_3$ | $ReCl_3$ |
| $BeBr_2$ | $TaBr_3$ | $FeCl_2$ | $TaCl_5$ |
| $BeCl_2$ | $TlCl_3$ | $FeCl_3$ | $ZnCl_2$ |
| $BeF_2$ | $SnBr_2$ | $FeI_2$ | $KI$ |
| $BeI_2$ | $SnCl_2$ | $LaBr_3$ | $BaCl_2$ |
| $BiBr_3$ | $ZnBr_2$ | $LaCl_3$ | $NH_4Br$ |
| $BiCl_3$ | $CuI$ | $LaI_3$ | |

The amount of catalyst employed is not critical. The exact amount will vary somewhat depending upon the specific catalyst and the specific organic disulfide reactant. The catalyst is present in a catalytic amount, generally from about 0.0005 mol to about 0.2 mol per mol of organic disulfide reactant. However, greater or lesser amounts can be employed. Preferably, the catalyst is present in an amount of at least about 0.005 mol per mole of organic disulfide reactant.

The separation of the desired phosphorus compound from the product mixture is readily accomplished by conventional means well known in the art, e.g. fractional distillation under reduced pressure, selective extraction, fractional distillation using a carrier gas, film distillation, elution or any suitable combination of these methods.

The phosphorus compounds produced by the process of this invention and numerous uses therefor are well known in the art. These compounds are useful as fire retardants and rust inhibitors, and chemical intermediates in the preparation of petroleum additives, agricultural chemicals, organophosphorus polymers and other products of commercial interest. For example, valuable lubricity additives for lubricating oils can be prepared by reacting the phosphorus compounds prepared by the process of this invention with phenol at temperatures from about 80° C. to about 150° C. in the presence of an acid acceptor in accordance with the following equations:

$$RP(S)X_2 + 2C_6H_5OH \rightarrow RP(S)(OC_6H_5)_2 + 2HX$$
$$R_2P(S)X + C_6H_5OH \rightarrow R_2P(S)OC_6H_5 + HX$$

wherein R and X are as defined above.

The following examples will illustrate the invention. Parts and percent are by weight unless otherwise indicated.

EXAMPLE 1

A pressure vessel is charged with 95.1 parts of methyl disulfide and 137.4 parts of phosphorus trichloride. The vessel is sealed and the reactants are heated at 275° C. for 12 hours. At the end of this time the vessel is cooled to room temperature, opened and the liquid product mixture is removed. Gas chromatographic analysis shows that the product mixture contains 36.2 weight percent methylphosphonothioic dichloride and 3.0 weight percent dimethylphosphinothioic chloride. The liquid product is fractionated and the methylphosphonothioic dichloride is recovered at 60–70° C., 50 mm. of mercury and the dimethylphosphinothioic chloride is recovered at 58–61° C., 10 mm. of mercury.

EXAMPLE 2

A reaction mixture comprising 62.8 parts of methyl disulfide and 137.4 parts of phosphorus trichloride is admitted into a U-tube immersed in a bath containing a heat transfer agent at a temperature of about 500° C. at the rate of about 4 parts per minute. A stream of dry nitrogen flowing at the rate of about 100 parts per minute is also admitted to the U-tube. The average residence time is about 10 seconds. The gas stream emerging from the U-tube is led into an ice-cooled receiver. Yields of dimethylphosphinothioic chloride and methylphosphonothioic dichloride comparable to those of Example 1 above are obtained.

Following the procedure of the foregoing examples and using the appropriate reactants the following organophosphonothioic dihalides are prepared:

EXAMPLES 3–28

3—ethylphosphonothioic dichloride
4—methylphosphonothioic dibromide
5—propylphosphonothioic dibromide
6—sec-butylphosphonothioic dichloride
7—amylphosphonothioic difluoride
8—heptylphosphonothioic dichloride
9—decylphosphonothioic difluoride
10—octadecylphosphonothioic dichloride
11—hexylphosphonothioic diiodide
12—methylphosphonothioic diiodide
13—allylphosphonothioic dichloride
14—propenylphosphonothioic dichloride 15—octenylphosphonothioic difluoride
16—butenylphosphonothioic dichloride
17—cycloheptylphosphonothioic difluoride
18—cycloheptenylphosphonothioic dichloride
19—cyclohexylphosphonothioic dichloride
20—cyclohexenylphosphonothioic dichloride
21—phenylphosphonothioic dichloride
22—benzylphosphonothioic dichloride
23—phenylethylphosphonothioic difluoride
24—tolylphosphonothioic dichloride
25—ethylphenylphosphonothioic dichloride
26—xylylphosphonothioic dichloride
27—trimethylphenylphosphonothioic dichloride
28—diethylphenylphosphonothioic dichloride

EXAMPLE 29

A pressure vessel is charged with 27 parts of methyl disulfide, 38 parts of phosphorus trichloride, and 2.3 parts of methyl iodide catalyst. The vessel is sealed and the reactants heated at 260° C. for 8 hours. At the end of this time the vessel is cooled and the product mixture removed. Nuclear magnetic resonance spectrum analysis indicates that 48.7 mol percent of the phosphorus compound content of the product mixture is methylphosphonothioic dichloride and 17.5 mol percent of the phosphorus compound content of the product mixture is dimethylphosphinothioic chloride. The product mixture is fractionated and the methylphosphonothioic dichloride is removed at 60–70° C., 50 mm. of mercury, and the dimethylphosphinothioic chloride is recovered at 58–61° C., 10 mm. of mercury.

EXAMPLE 30

A pressure vessel is charged with 27 parts of methyl disulfide, 38 parts of phosphorus trichloride and 3 parts of iodine. The vessel is sealed and the reactants heated at 245° C. for 8 hours. At the end of this time the vessel is cooled and the product mixture recovered. Nuclear magnetic resonance spectrum analysis indicates that 28.6 mol percent of the phosphorus compound content of the product mixture is methylphosphonothioic dichloride and 11.4 mol percent of the phosphorus compound content of the product mixture is dimethylphosphinothioic chloride. The product mixture is fractionated and the methylphosphonothioic dichloride is removed at 60–70° C., 50 mm. of mercury, and the dimethylphosphinothioic chloride is recovered at 58–61° C., 10 mm. of mercury.

EXAMPLES 31 TO 50

Equimolar amounts of organic disulfide and the appropriate phosphorus trihalide are heated at 245° C. for 8 hours in the presence of the catalysts listed in Table I below following the procedure of Example 30. At the end of this time, the product mixtures are each subjected to NMR spectrum analysis. In all examples, amounts of organophosphonothioic dihalide and diorganophosphinothioic halide comparable to those of Examples 29 and 30 are obtained.

The embodiments of the invention in which an exclusive property or privilege is claimed are defined as follows:

1. Process for the preparation of phosphorus compounds selected from the group consisting of compounds of the formula

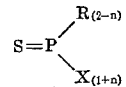

wherein R is hydrocarbyl of not more than 18 carbon atoms selected from the group consisting of alkyl, alkenyl, alkynyl, cycloalkyl, cycloalkenyl, aryl, aralkyl and alkaryl, X is selected from the group consisting of Cl, Br, F and I and $n$ is an integer from 0 to 1, and mixtures thereof which comprise reacting an organic disulfide of the formula RSSR with a phosphorus trihalide of the formula $PX_3$ at a temperature from about 100° C. to about 600° C. wherein R and X are as defined above.

2. The process of claim 1 wherein the reaction is carried out in the liquid phase at a temperature above about 150° C.

3. The process of claim 1 wherein the reaction is carried out in the vapor phase at a temperature above about 300° C.

4. The process of claim 1 wherein the organic disulfide is an alkyl disulfide.

5. The process of claim 1 wherein the organic disulfide is aryl disulfide.

6. The process of claim 1 wherein the phosphorus trihalide is phosphorus trichloride.

7. The process of claim 4 wherein the alkyl disulfide is methyl disulfide.

8. The process of claim 5 wherein the aryl disulfide is phenyl disulfide.

9. The process of claim 1 carried out in the presence of a halide catalyst selected from the group consisting of (a) organic halides of the formula $(R')X_m$ wherein R' is hydrocarbyl of not more than 18 carbon atoms selected from the group consisting of alkyl, alkenyl, alkynyl, cycloalkyl and aralkyl, X is halogen and $m$ is an integer from 1 to 3, and (b) inorganic halides of the formula $MeX_v$ wherein Me is selected from the group consisting of metal and $NH_4$, X is halogen, and $v$ is the valence of Me and is an integer from 1 to 6, and (c) halogens selected from the group consisting of $Cl_2$, $Br_2$ and $I_2$.

10. The process of claim 9 wherein the halide catalyst is an organic halide of the formula $(R')X_m$ wherein R' is hydrocarbyl of not more than 18 carbon atoms selected from the group consisting of alkyl, alkenyl, alkynyl, cycloalkyl and aralkyl, X is halogen and $m$ is an integer from 1 to 3.

11. The process of claim 9 wherein the halide catalyst is an inorganic halide of the formula $MeX_v$ wherein Me is selected from the group consisting of metal and $NH_4$, X is halogen, and $v$ is the valence of Me and is an integer from 1 to 6.

12. The process of claim 10 wherein the organic halide catalyst is methyl iodide.

TABLE I

| Example | PX₃ | Organic sulfide | Catalyst | Amount [1] |
|---|---|---|---|---|
| 31 | PCl₃ | Methyl disulfide | NaCl | 0.1 |
| 32 | PCl₃ | Ethyl disulfide | KBr | 0.025 |
| 33 | PBr₃ | Propyl disulfide | ZnI₂ | 0.01 |
| 34 | PBr₃ | Hexyl disulfide | HgCl₂ | 0.2 |
| 35 | PCl₃ | Allyl disulfide | SnCl₄ | 0.05 |
| 36 | PI₃ | Propargyl disulfide | Butyl bromide | 0.005 |
| 37 | PI₃ | n-Pentenyl-1 disulfide | PbCl₂ | 0.05 |
| 38 | PCl₃ | Dodecyl disulfide | Ethylene dibromide | 0.01 |
| 39 | PCl₃ | Methyl disulfide | TiBr₄ | 0.05 |
| 40 | PBr₃ | do | KI | 0.0005 |
| 41 | PBr₃ | do | NH₄Br | 0.001 |
| 42 | PCl₃ | Phenyl disulfide | 1,3,5-tri-iodopentane | 0.002 |
| 43 | PI₃ | Cyclohexyl disulfide | Propargyl bromide | 0.001 |
| 44 | PI₃ | 1-cyclohexenyl disulfide | Allyl chloride | 0.005 |
| 45 | PI₃ | Benzyl disulfide | Benzyl chloride | 0.006 |
| 46 | PBr₃ | Methyl disulfide | 1-bromo-3-iodocyclohexane | 0.001 |
| 47 | PCl₃ | Tolyl disulfide | 2,2-dichlorododecane | 0.007 |
| 48 | PCl₃ | Methyl disulfide | 3-chloromethyl-n-pentylene-1 | 0.0009 |
| 49 | PCl₃ | Cycloheptyl disulfide | 2-chlorocycloheptane | 0.003 |
| 50 | PF₃ | Methyl disulfide | ZnCl₂ | 0.01 |

[1] Mols of catalyst per mol of organic sulfide reactant.

13. The process of claim 1 wherein the organic disulfide is methyl disulfide and the phosphorus trihalide is phosphorus trichloride.

14. The process of claim 9 wherein the organic disulfide is methyl disulfide and the halide catalyst is methyl iodide.

15. The process of claim 9 wherein the organic disulfide is methyl disulfide and the halide catalyst is $I_2$.

References Cited

UNITED STATES PATENTS

| | | | |
|---|---|---|---|
| 2,682,554 | 6/1954 | Crouch et al. | 260—972 |
| 3,099,132 | 7/1963 | Condit | 260—972 |
| 3,193,372 | 7/1965 | Regel | 260—960 |

FOREIGN PATENTS

| | | |
|---|---|---|
| 532,078 | 10/1956 | Canada. |
| 1,123,664 | 2/1962 | Germany. |

LEON ZITVER, *Primary Examiner.*

J. E. EVANS, *Assistant Examiner.*

U. S. Cl. X.R.

252—46.6; 260—961, 973